United States Patent [19]
Brickner et al.

[11] Patent Number: 5,235,889
[45] Date of Patent: Aug. 17, 1993

[54] COMPOUND MITER SAW

[75] Inventors: Louis C. Brickner, Pittsburgh; Jaime E. Garcia, Wexford, both of Pa.

[73] Assignee: Delta International Machinery Corp., Pittsburgh, Pa.

[21] Appl. No.: 854,380

[22] Filed: Mar. 25, 1992

[51] Int. Cl.⁵ .............................. B26D 1/16
[52] U.S. Cl. ................... 83/471.3; 83/473; 83/581; 83/699; 403/91; 403/147
[58] Field of Search ............ 83/699, 473, 471.3, 83/468.3, 581; 403/91, 101, 147, 334

[56] References Cited

U.S. PATENT DOCUMENTS

| | | | |
|---|---|---|---|
| 2,752,959 | 7/1956 | Knapp | 83/473 |
| 2,809,490 | 10/1957 | Oeters | 403/91 X |
| 4,152,961 | 5/1979 | Batson | 83/471.3 |
| 4,452,117 | 6/1984 | Brickner et al. | 83/468.3 |
| 4,537,105 | 8/1985 | Bergler | 83/471.3 |
| 4,581,966 | 4/1986 | Kaiser et al. | 83/397 |
| 4,587,875 | 5/1986 | Deley | 83/473 X |
| 4,774,866 | 10/1988 | Dehari et al. | 83/478 |
| 4,869,142 | 9/1989 | Sato et al. | 83/467.1 |
| 4,934,233 | 6/1990 | Brundage et al. | 83/397 |
| 5,042,348 | 8/1991 | Brundage et al. | 83/471.3 |

OTHER PUBLICATIONS

D. DeCristoforo, "Getting an Apple on Compound Miters" *Fine Woodworking*, Dec. 1989/Jan. 1990, pp. 58-62.
Delta 34-985 & 34-995 Stockfeeder Parts List SF-1, Part No. 1340205, Revised Jul. 10, 1986.
Delta 36-220 10" Compound Miter Saw Parts List MB-4, Part No. 1344220, Revised Aug. 12, 1991.
Delta 10" Compound Miter Saw (Model 36-220) Instruction Manual, Dated Jan. 4, 1991.

*Primary Examiner*—Frank T. Yost
*Assistant Examiner*—Kenneth E. Peterson
*Attorney, Agent, or Firm*—Merchant, Gould, Smith, Edell, Welter & Schmidt

[57] ABSTRACT

A compound miter saw or the like comprising a base having a lower surface for supporting the base on a work surface. A turntable is rotatably supported by the base, and a fence is disposed above the work table for supporting the orientation of a workpiece located on the base. A support is coupled to the turntable at a rear portion of the turntable.

The compound miter saw disclosed also includes a cuttinghead system for cutting the workpiece. The cuttinghead system comprises a pivoting system coupled to the support for pivoting a motor driven saw between a raised, rest position and a lowered, operational position.

A compound miter saw beveling system comprises a male conical taper structure having an outer surface defining a cone-shaped member, the cone-shaped member being coupled to the support. The beveling system further comprises a female conical taper structure defining a cavity having a conically-shaped inner wall, the conically-shaped inner wall having a configuration substantially matching the outer surface of the cone-shaped member. The female conical taper structure is coupled to the cuttinghead system.

9 Claims, 8 Drawing Sheets

COMPOUND MITER SAW

BACKGROUND AND SUMMARY OF THE INVENTION

The present invention relates to a compound miter saw and, more particularly, to an improved system for positioning of the cuttinghead for producing beveled cuts.

The present invention is embodied in a compound miter saw or the like comprising a base having a lower surface for supporting the base on a work surface. A turntable is rotatably supported by the base, and a fence is disposed above the work table for supporting the orientation of a workpiece located on the base. A support is coupled to the turntable at a rear portion of the turntable.

The compound miter saw disclosed also includes a cuttinghead system for cutting the workpiece. The cuttinghead system comprises a pivoting system coupled to the support for pivoting a motor driven saw between a raised, rest position and a lowered, operational position.

The compound miter saw disclosed in U.S. Pat. No. 4,934,233 assigned to Emerson Electrical Co. provides a beveling mechanism which substantially comprises a first right circular cylinder formed into the support and a second right circular cylinder formed into the cuttinghead system. These two right circular cylinders face one another and have relatively limited surface areas which interface. The interfacing surface areas are held together with a biasing system that can be loosened for the purpose of pivoting the cuttinghead system to a desired position for a beveled cut and that can be tightened for securing the cuttinghead system at the selected bevel angle. However, the relatively small surface area between the two face to face ends of the right circular cylinders disclosed in U.S. Pat. No. 4,934,233 can affect the stability for the cuttinghead, particularly when subjected to wear over continued use.

In contrast, the present compound miter saw beveling system provides a surface area having a conically configured interface which, even when subjected to wear, remains extremely stable during beveling adjustments of the cuttinghead and during use of the cuttinghead in locked positions.

The present beveling system comprises a male conical taper structure having an outer surface defining a cone-shaped member, the cone-shaped member being coupled to the support The beveling system further comprises a female conical taper structure defining a cavity having a conically-shaped inner wall, the conically-shaped inner wall having a configuration substantially matching the outer surface of the cone-shaped member. The female conical taper structure is coupled to the cuttinghead system.

The present beveling system further comprises a biasing system for permitting a user to adjustably bias the conically-shaped inner wall of the female conical taper structure onto the outer surface of the cone-shaped member. The biasing system permits selectively loosening the bias in order to enable the conically-shaped inner wall to rotate on the outer surface of the cone-shaped member, and therefore, enable the user to adjust the bevel of the cuttinghead system. The biasing system further permits selectively tightening the bias so that the user can lock the bevel of the cuttinghead system in a preferred position.

BRIEF DESCRIPTION OF THE PREFERRED EMBODIMENT

The compound miter saw illustrated in the drawings comprises a base 10 having a lower surface 12 for supporting the base on a work surface. A turntable 14 is rotatably supported by base 10. A fence 16 is disposed above base 10 for supporting the orientation of a workpiece located on the base. A support 18 is coupled by conventional means to turntable 14 at a rear portion of the turntable.

The miter box shown further comprises a cuttinghead system for cutting the workpiece. The cuttinghead system may comprise an arm 20 coupled to support 18 by a pivoting system 21 which pivots about a bolt or similar hardware 22 for positioning a motor driven saw 24 between a raised, rest position and a lowered, operational position. In the embodiment disclosed, a motor 26 drives saw 24 through an arbor directly coupled to motor 26. Saw 24 is energized by depressing switch trigger 32, which is electrically coupled to motor 26.

In its preferred configuration, the miter saw will cut any angle from a straight 90 degree cut to 47 degrees right and left. To adjust the angle of the cut, lock handle 34 is loosened and spring index 36 is depressed, enabling the turntable to be set at any angle by tightening lock handle 34. The miter saw shown is equipped with positive stops 38 at the 0, 15, 22½, 30 and 45 degrees right and left positions. In order to employ these positive stops, lock handle 34 is loosened and moved either right or left as desired until spring index 36 engages into one of the positive stops. A pointer 40 and scale 42 (numbers not shown) are used to locate angles of cut in between positive stops 38.

Figure 5:
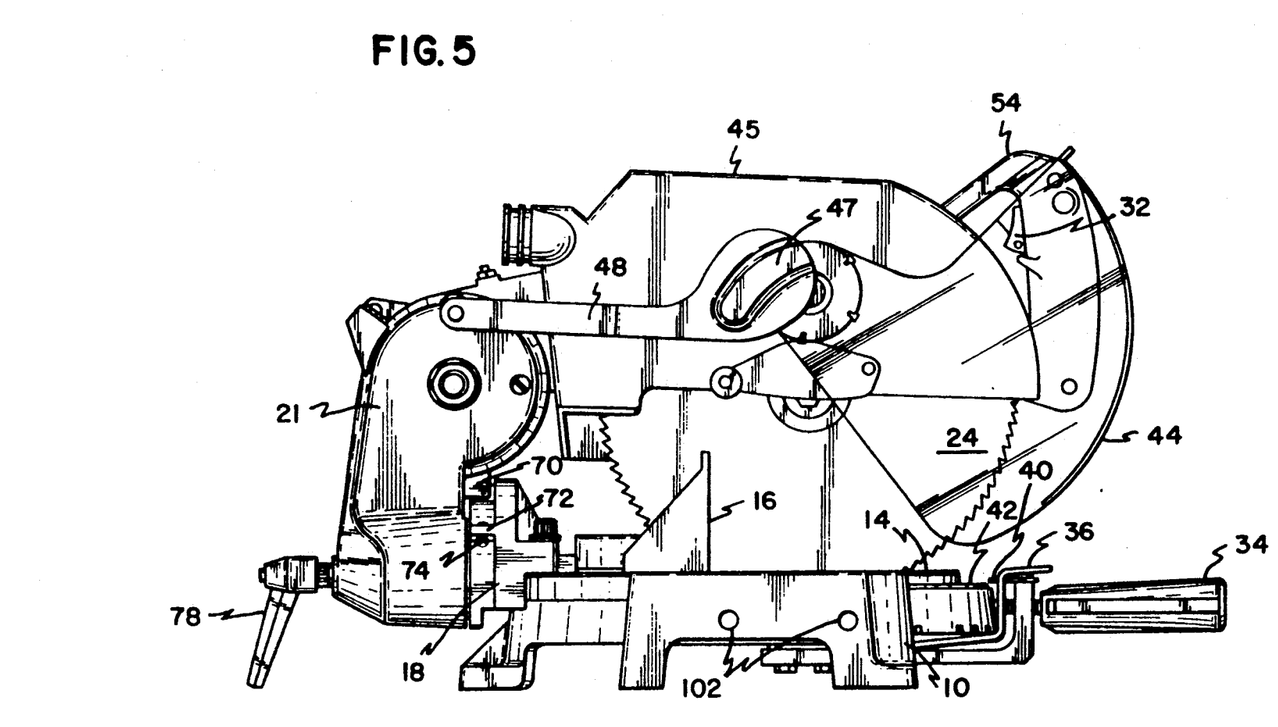
FIG. 5 illustrates a left side elevational view which, in contrast to the other Figures, shows the saw in a lowered, operational position.

Saw 24 is protected by both a fixed-position upper blade guard 45 and a movable lower blade guard 44. When a cut is made in the workpiece, lower blade guard 44 automatically moves upward (see FIG. 5) in order to expose blade 24 to the workpiece. Lower blade guard 44 rotates about a pivot located on upper blade guard 45. In the embodiment shown, lower blade guard 44 is activated by linkage bar 48 which is coupled between pivot system 21 and a pivot point eccentrically located on lower blade guard 44. A cam-shaped portion 47 of linkage bar 48 permits lower blade guard 44 to be manually lifted for the purpose of changing blades or the like. A cuttinghead handle 54 is coupled to the cuttinghead system for guiding movement of saw 24 between the raised, rest position and the lowered, operational position.

Figure 1:
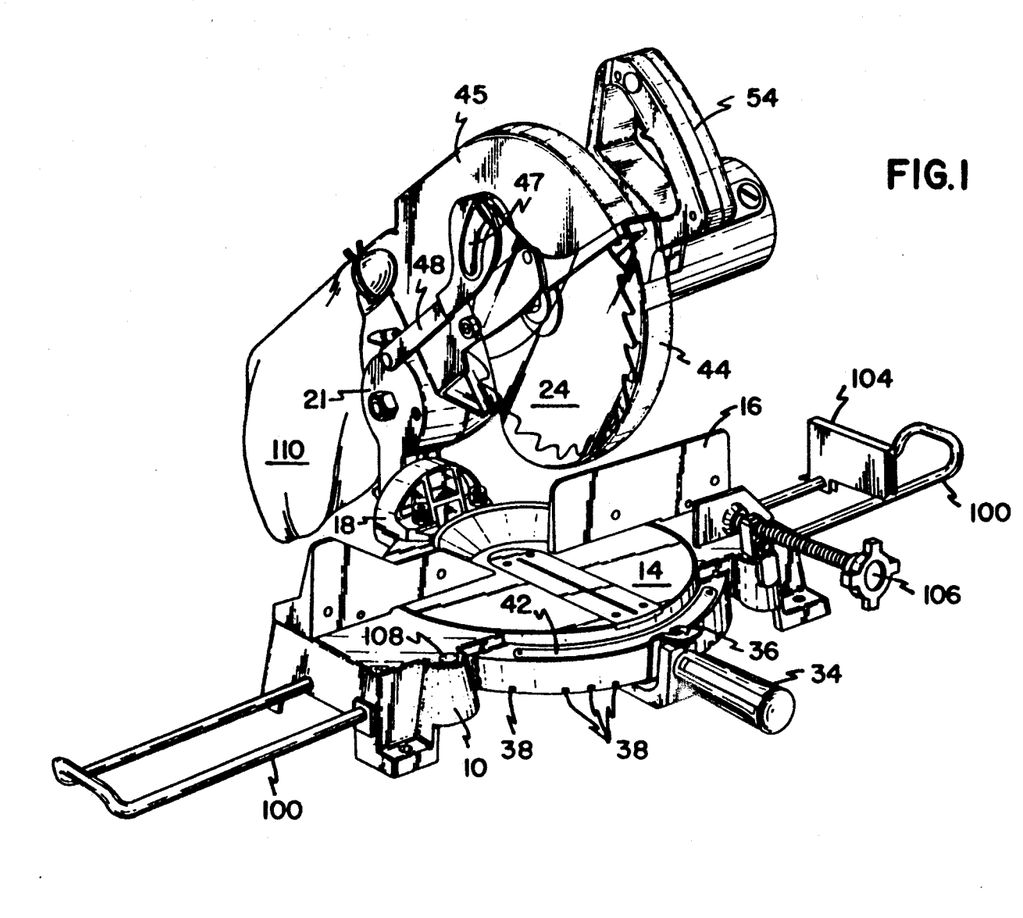
FIG. 1 illustrates a top front and left side perspective of a compound miter saw. This figure includes table extension, stop, vise and dust bag accessories that are not shown in the remaining figures.
Figure 2:
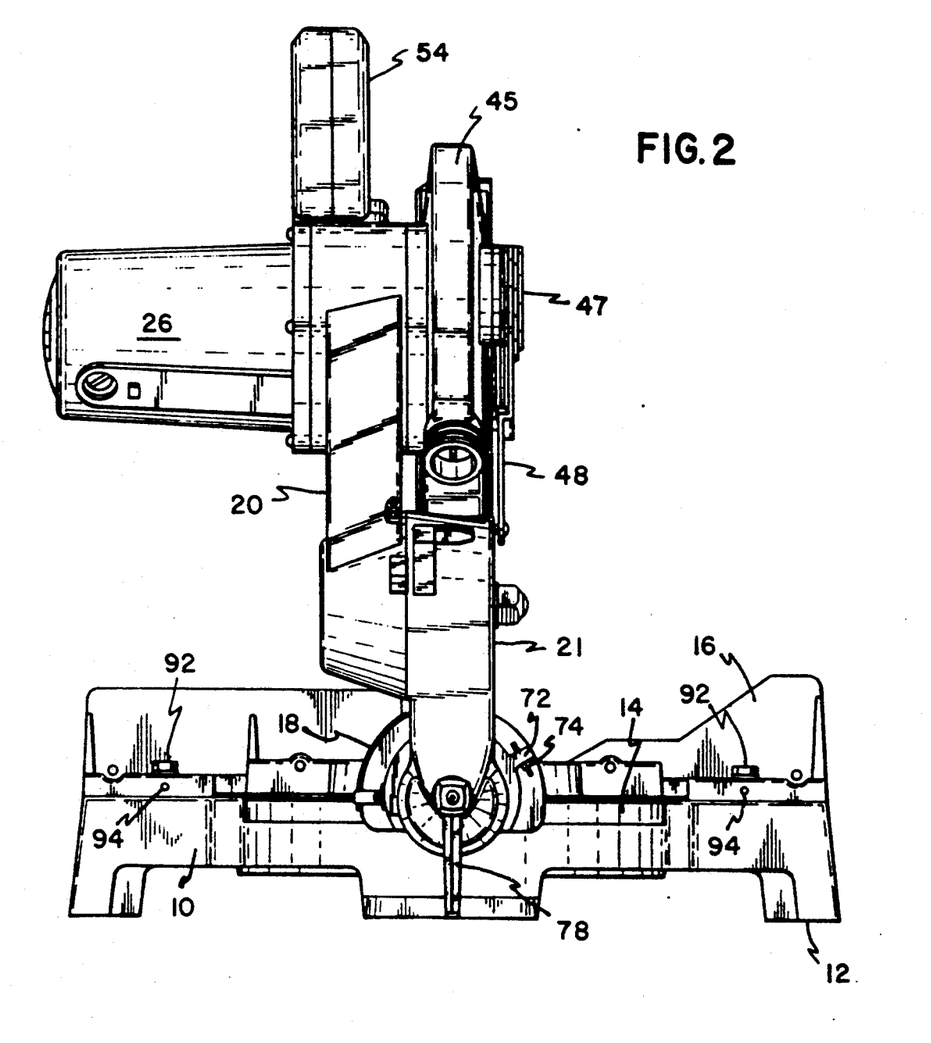
FIG. 2 shows a rear plan view of a compound miter saw.
Figure 3:
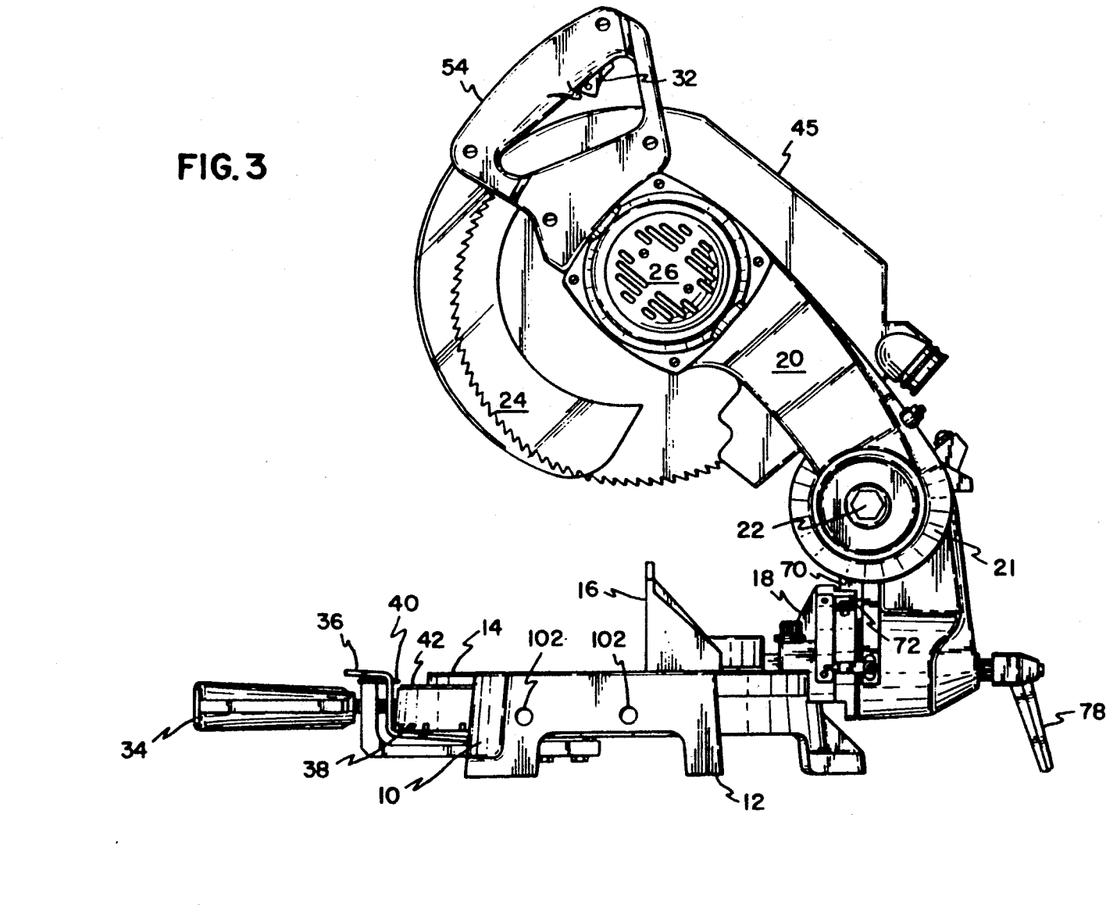
FIG. 3 shows a right side elevational view of a compound miter box.
Figure 4:
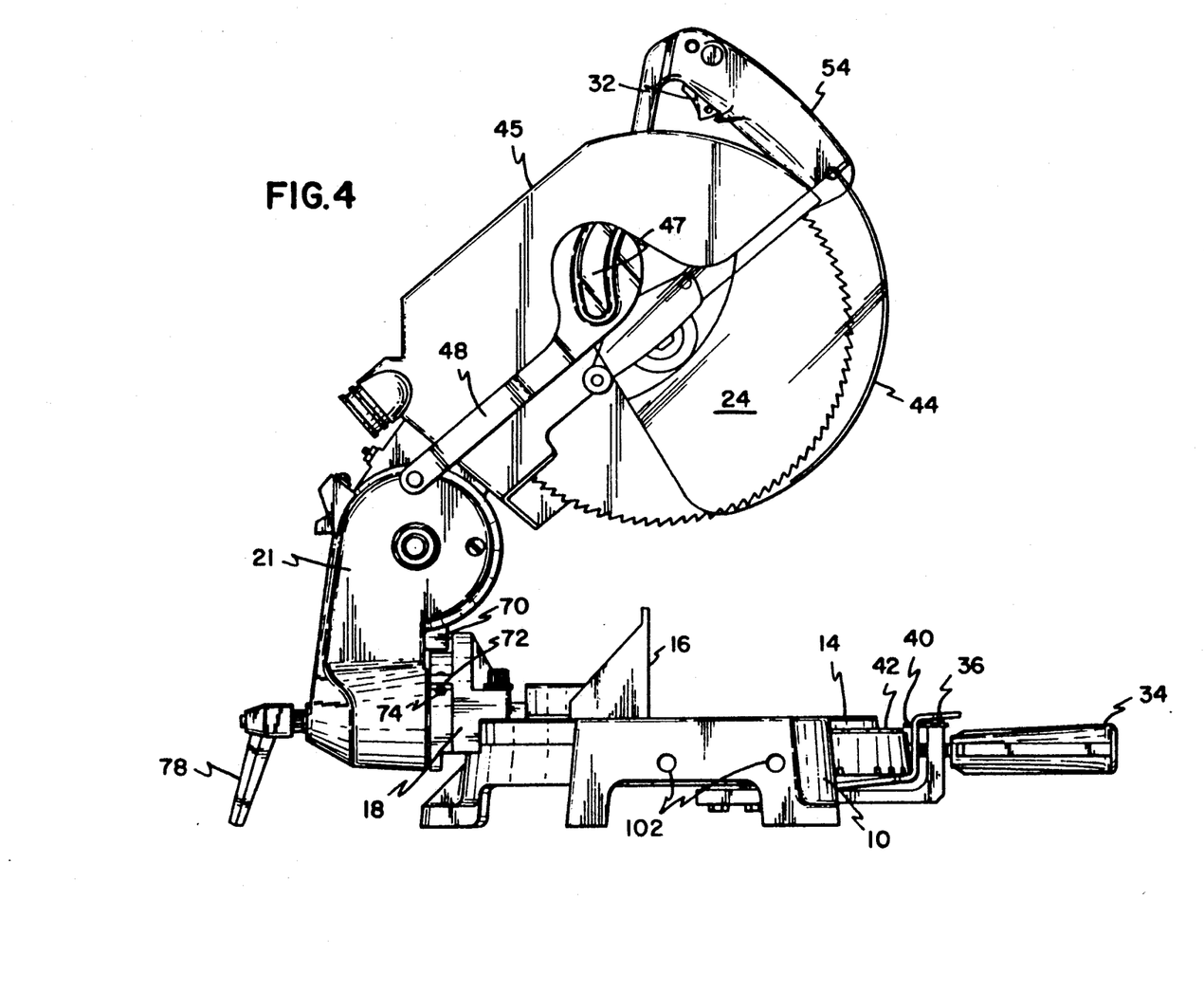
FIG. 4 illustrates a left side elevational view of a compound miter box.

As is shown in FIG. 1, the preferred embodiment of the present compound miter saw comprises table extensions 100 which may be formed of shaped rod stock and fitted into apertures 102 defined in the ends of base 10. FIG. 1 also shows an adjustable workpiece stop 104 and an accessory vise clamp 106 which can be positioned on either side of blade 24 in apertures 108 defined by base 10. A dust bag 110 is also shown coupled to the sawdust output portion of upper blade guard 45.

In the preferred embodiment, blade 24 is 10 inches (254 millimeters) in diameter, and all other parts of the preferred embodiment are drawn to scale in the figures.

Those skilled in the art will recognize that many alternate configurations of miter saws including changes to base 10, turntable 14, motor drive arrangements, guard arrangements, linkage arrangements, dimensions, and the like may be used and that those shown in the drawings and explained above are set forth by way of example only.

Figure 6:
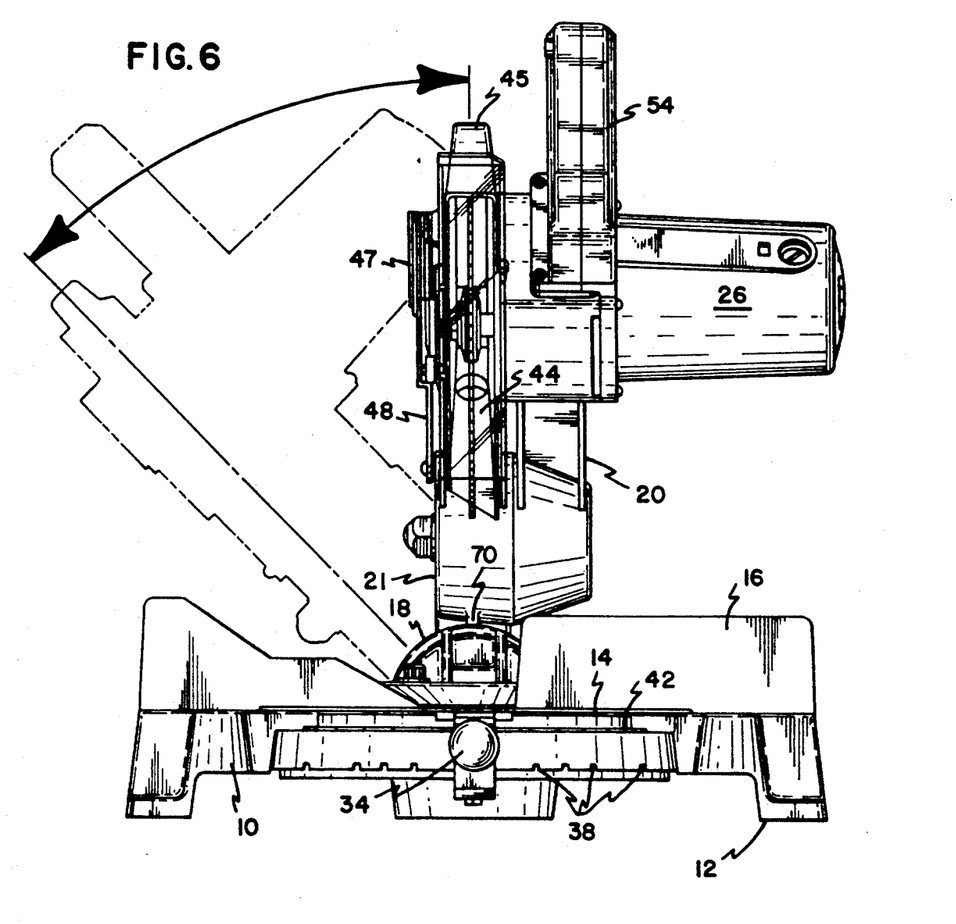
FIG. 6 illustrates a front elevational view of a compound miter box showing the cuttinghead system beveled to an angle of substantially 45 degrees.
Figure 7:
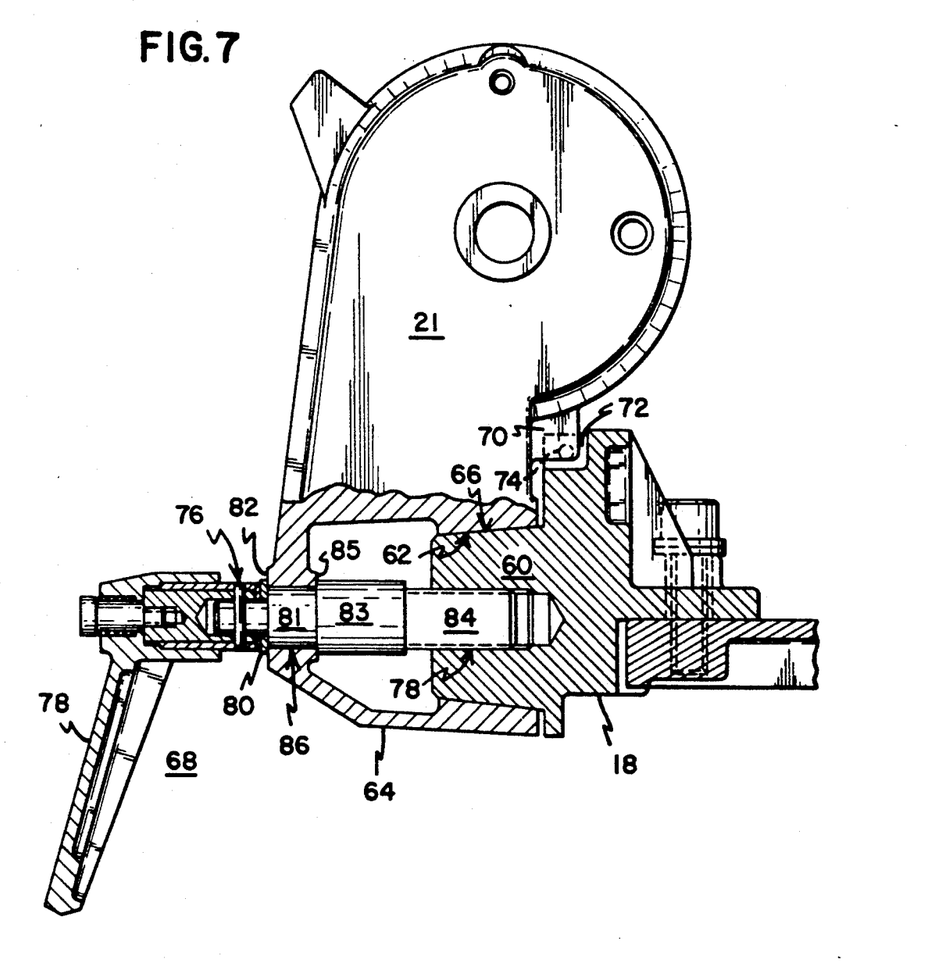
FIG. 7 illustrates in cross-sectional view a preferred embodiment of the present beveling system invention.

The compound miter saw disclosed includes a beveling system for positioning the cuttinghead system so that it can be selectively positioned for cutting the workpiece not only perpendicular to table 14 but also with a bevel of up to at least 45 degrees from perpendicular, as is illustrated in FIG. 6. As can be seen in FIG. 7, the preferred beveling system comprises a male conical taper structure 60 comprising an outer surface 62 defining a cone-shaped member, the cone-shaped member being coupled to support 18. A female conical taper structure 64 defines a cavity having a conically-shaped inner wall 66 with a configuration substantially matching the outer conical surface shape 66 of cone-shaped member 60. Female conical taper structure 64 is coupled to the cuttinghead system via a pivoting system 21, which may comprise any suitable pivoting system familiar to those skilled in the art.

The present beveling system includes a biasing system 68 for permitting a user to adjustably bias the conically-shaped inner wall 66 of female conical taper structure 64 onto outer conical surface 62 of cone-shaped member 60. Biasing system 68 comprises a system for loosening the bias in order to permit conically-shaped inner wall 66 to rotate on the outer conical surface 62 of cone-shaped member 60 and, therefore, permit the user to adjust the bevel of the cuttinghead system. Biasing system 68 further comprises a system for selectively tightening the bias so that the user can lock the bevel of the cuttinghead system in a preferred position.

Figure 8:
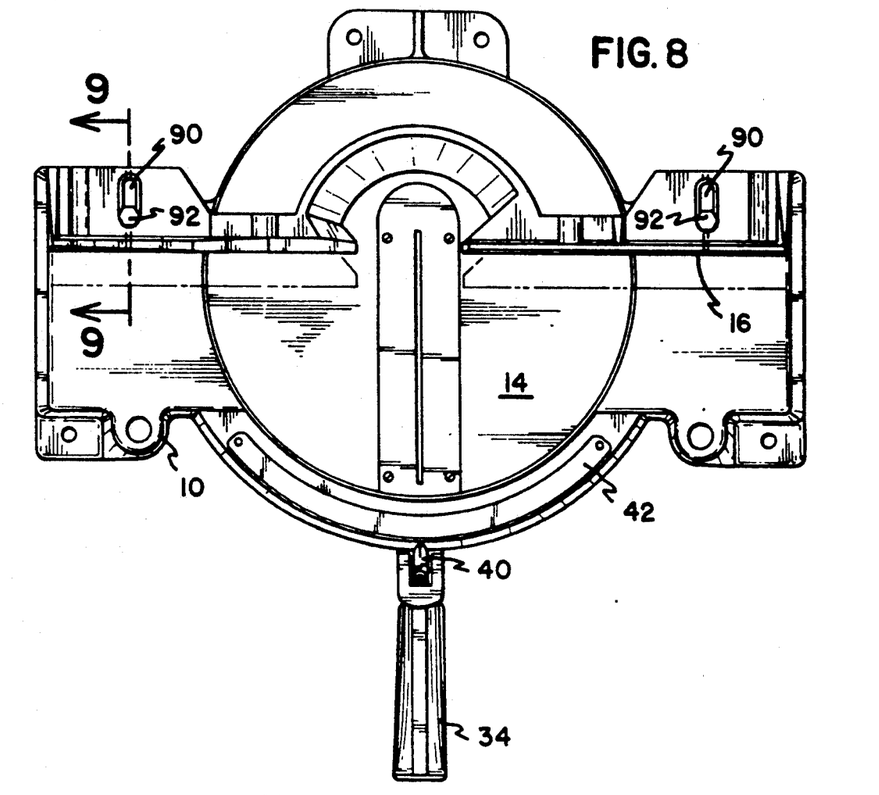
FIG. 8 illustrates a top plan view of a motorized miter box devoid of the support and cuttinghead system and illustrates a movable fence.

As can be seen in FIG. 8, in the embodiment shown, cone-shaped member 60 comprises a truncated cone. In the preferred embodiment, outer conical surface 62 of cone-shaped member 60 defines an included angle of approximately 10 degrees. In the judgment of the applicants, outer conical surface 62 of cone-shaped member 60 may define an included angle within a range of 8 degrees and 12 degrees and still provide satisfactory performance, it being noted that a larger range may also be acceptable.

The cuttinghead system and the support each preferably comprise a stop system having a stop structure for stopping the beveling movement of the cuttinghead system at both a first position in which saw 24 is positioned substantially perpendicular to table 14 and a second position in which saw 24 is positioned at substantially 45 degrees to table 14. These stop systems preferably comprise an adjustment system for adjusting the first and second positions so that saw 24 can be precisely set to the respective perpendicular or 45 degree positions. In the embodiment shown, these stop structures protrude from pivoting structure 21 of the cuttinghead system and from support 18 and are positioned in alignment so that they contact one another as the cuttinghead system is pivoted. In the preferred embodiment, pivoting system 21 of the cuttinghead system comprises a single stop structure 70 and support 18 comprises two stop structures 72, and the two stop structures of support 18 define threaded apertures through which threaded stops 74 are adjustably positioned.

In the preferred embodiment, biasing system 68 comprises a threaded handle system 76 which forces female conical taper structure 64 toward male conical taper structure 60 in order to increase the bias between the outer conical surface 62 of the cone-shaped member 60 and the conically-shaped inner wall 66 of the female conical taper structure 64. As can be seen in FIG. 7, handle 78 of biasing system 68 comprises a flange 80 which presses against a rear surface 82 of female conical taper structure 64. Handle 78 comprises a shaft 81 having a threaded portion 84 matching the thread of a threaded aperture 78 defined by cone-shaped member 60. Shaft 81 passes through an aperture 86 in the rear portion of female conical taper structure 64. Shaft 81 comprises an enlarged diameter portion 83 having a diameter larger than aperture 86. Enlarged shaft portion fits within female conical structure 64 and has a surface which bears against a rear inner wall 85 of female conical structure 64. Stop 80 and handle 78 are assembled to shaft 81 after the shaft is positioned through aperture 86. Handle 78 may be of the spring-loaded, self-indexing, ratchet handle type familiar to those skilled in the art.

When handle 78 is turned in a direction to loosen biasing system 68, enlarged shaft portion 83 pushes against inner wall 85 of female conical taper structure 64 and forces the conically-shaped inner wall of female conical taper structure 64 to pull slightly away from outer conical surface 66 of cone-shaped member 60. This enables the conically-shaped inner wall 66 of female conical taper structure 64 to smoothly rotate over the outer conical surface 66 of cone-shaped member 60. On the other hand, when handle 78 is turned in a direction to tighten biasing system 68, conically-shaped inner wall 66 of female conical structure 64 is biased onto outer conical surface 62 of cone-shaped member 60, a process which securely locks the cuttinghead system into a position selected by the user.

Figure 9:
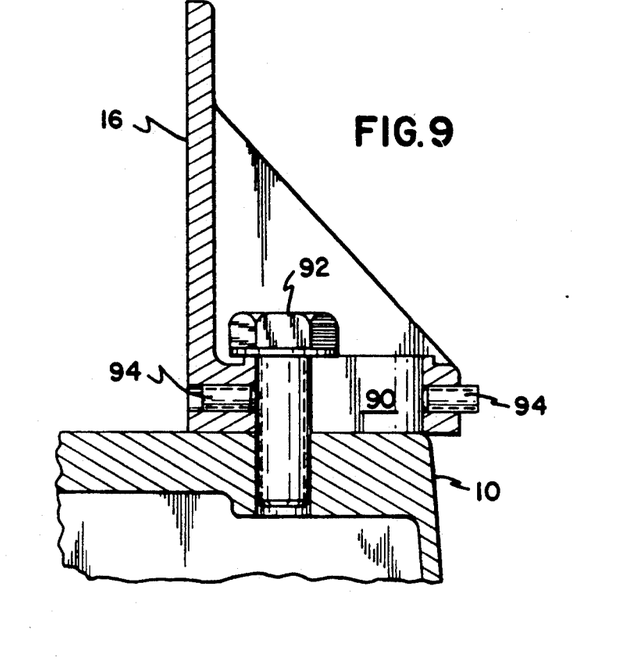
FIG. 9 illustrates a preferred system for adjustably moving the fence and for adjusting the orientation of the fence so that it is at precisely 90 degrees to the saw blade when the fence is either in its most rearward or most forward position.

As is shown in FIGS. 8 and 9, fence 16 can be adjusted in a rearward position which enables saw 24 to cut relatively thin stock to a maximum width and a front position illustrated by the phantom lines in FIG. 8) which enables relatively thick stock to be cut completely through without having an incomplete portion of the cut toward the rear of the workpiece.

The adjustable nature of fence 16 in the preferred embodiment is accomplished through two slots 90 defined by fence 16, slots 90 having an orientation parallel to the orientation of blade 24 when blade 24 is positioned to be perpendicular to fence 16. Bolts or similar hardware 92 secure fence 16 to base 10 through threaded apertures defined by base 10. By loosening bolts 92, fence 16 can be moved to its most forward and rearward positions as limited by the length of slots 90. Set screws 94 are located in threaded apertures defined by fence 16 and adjustably protrude into slots 90 from each end of slot 90 so that fence 16 can be adjusted to be precisely 90 degrees to blade 24 when turntable 14 is in its nominal 90 degree position.

The present invention is to be limited only in accordance with the scope of the appended claims, since others skilled in the art may devise other embodiments still within the limits of the claims.

What is claimed is:

1. A compound miter saw, comprising:
   (a) a base;
   (b) a turntable rotatably supported by the base;
   (c) a fence disposed above the base for supporting the orientation of a workpiece located on the base;
   (d) a support coupled to the turntable at a rear portion of the turntable;
   (e) cuttinghead means for cutting the workpiece, the cuttinghead means comprising a pivoting system coupled to the support for pivoting a motor driven saw between a raised, rest position and a lowered, operational position; and
   (f) beveling means for positioning the cuttinghead means so that it can be selectively positioned for cutting the workpiece not only perpendicular to the table but also with a bevel of up to at least 45 degrees from perpendicular, the beveling means comprising:
      (i) a male conical taper structure comprising an outer surface defining a cone-shaped member, the cone-shaped member being coupled to the support;
      (ii) a female conical taper structure defining a cavity having a conically-shaped inner wall, the conically-shaped inner wall having a configuration substantially matching the outer conical surface shape of the cone-shaped member, the female conical taper structure being coupled to the cuttinghead means; and
      (iii) biasing means for permitting a user to adjustably bias the conically-shaped inner wall of the female conical taper structure onto the outer conical surface of the cone-shaped member in order to lock the two taper structures together, the biasing means comprising unlocking means for moving the female conical taper structure away from the outer conical surface of the cone shaped member in order to permit the conically-shaped inner wall to rotate on the outer conical surface of the cone-shaped member and, therefore, permit the user to adjust the bevel of the cuttinghead means.

2. The compound miter saw of claim 1 wherein the cone-shaped member comprises a truncated cone.

3. The compound miter saw of claim 1 wherein the outer conical surface of the cone-shaped member defines an included angle of approximately 10 degrees.

4. The compound miter saw of claim 1 wherein the outer conical surface of the cone-shaped member defines an included angle within the range of 8 degrees and 12 degrees.

5. The compound miter saw of claim 1 wherein the cuttinghead means and the support each comprise stop means comprising a stop structure for stopping the beveling movement of the cuttinghead means both at a first position in which the saw is positioned substantially perpendicular to the table and at a second position in which the saw is positioned at substantially 45 degrees to the table.

6. The compound miter saw of claim 5 wherein at the stop means comprises adjustment means for adjusting the first and second positions so that the saw is precisely set to the respective perpendicular or 45 degree positions.

7. The compound miter saw of claim 5 wherein the stop structures protrude from the cuttinghead means and the support and are positioned in alignment so that they contact one another as the cuttinghead means is positioned between the first and second positions.

8. The compound miter saw of claim 7 wherein the cuttinghead means comprises a single stop structure, the support comprises two stop structures, and the two stop structures of the support define threaded apertures through which threaded stops are adjustably positioned.

9. The compound miter saw of claim 1 wherein the biasing means comprises a threaded handle which cooperates with a threaded aperture defined by the male cone-shaped member to selectively pull the female conical taper structure toward the male conical taper structure in order to increase the bias between the outer conical surface of the cone-shaped member and the conically-shaped inner wall of the female conical taper structure and to selectively push the female conical taper structure away from the male conical taper structure in order to decrease the bias between the outer conical surface of the cone-shaped member and the conically-shaped inner wall of the female conical taper structure.

* * * * *